(12) United States Patent
Takao et al.

(10) Patent No.: US 9,564,802 B2
(45) Date of Patent: Feb. 7, 2017

(54) ELECTRIC POWER CONVERSION DEVICE

(71) Applicant: Kabushiki Kaisha Toshiba, Minato-ku (JP)

(72) Inventors: Kazuto Takao, Tsukuba (JP); Takashi Shinohe, Yokosuka (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 49 days.

(21) Appl. No.: 14/478,445

(22) Filed: Sep. 5, 2014

(65) Prior Publication Data
US 2015/0085548 A1  Mar. 26, 2015

(30) Foreign Application Priority Data

Sep. 20, 2013  (JP) .................................. 2013-195790
Aug. 8, 2014   (JP) .................................. 2014-162766

(51) Int. Cl.
*H02M 7/537*  (2006.01)
*H02M 3/155*  (2006.01)
(Continued)

(52) U.S. Cl.
CPC ............... *H02M 3/155* (2013.01); *H02M 1/44* (2013.01); *H02M 7/5387* (2013.01); *H02M 2003/1555* (2013.01); *Y02B 70/1441* (2013.01)

(58) Field of Classification Search
CPC  H02M 1/44; H02M 2003/1555; H02M 3/155; H02M 7/5387; Y02B 70/1441
See application file for complete search history.

(56) References Cited

U.S. PATENT DOCUMENTS

2004/0075399 A1   4/2004 Hall
2004/0113596 A1*  6/2004 Peron .................... H02M 3/155
                                                        323/282
(Continued)

FOREIGN PATENT DOCUMENTS

CN    102377330 A    3/2012
CN    103299523 A    9/2013
(Continued)

OTHER PUBLICATIONS

Extended European Search Report issued Mar. 17, 2015 in Patent Application No. 14183572.8.
(Continued)

*Primary Examiner* — Jessica Han
*Assistant Examiner* — Demetries A Gibson
(74) *Attorney, Agent, or Firm* — Oblon, McClelland, Maier & Neustadt, L.L.P.

(57) ABSTRACT

An electric power conversion device of an embodiment includes the electric power conversion device expressed as an equivalent circuit including, a power supply, a first parasitic inductance, a first diode; a second parasitic inductance connected to the first diode in series, a second diode connected to the first diode in parallel, a third parasitic inductance connected to the second diode in series, a switching element, a gate circuit, and a load. The equivalent circuit includes a first circuit loop and a second circuit loop. The first circuit loop includes the power supply, the first parasitic inductance, the first diode, the second parasitic inductance, the switching element, and the gate circuit. The second circuit loop includes the power supply, the first parasitic inductance, the second diode, the third parasitic inductance, the switching element, and the gate circuit.

13 Claims, 5 Drawing Sheets

(51) Int. Cl.
*H02M 1/44* (2007.01)
*H02M 7/5387* (2007.01)

(56) References Cited

U.S. PATENT DOCUMENTS

| | | | | |
|---|---|---|---|---|
| 2006/0028186 A1* | 2/2006 | Yan | ................ | H02M 3/155 |
| | | | | 323/225 |
| 2006/0076942 A1* | 4/2006 | Huber | ................ | H02M 3/155 |
| | | | | 323/282 |
| 2009/0168471 A1 | 7/2009 | Tsugawa et al. | | |
| 2009/0206812 A1 | 8/2009 | Sasaya et al. | | |
| 2010/0237843 A1* | 9/2010 | Rivet | ................ | H02M 3/155 |
| | | | | 323/282 |
| 2012/0206123 A1* | 8/2012 | Mulligan | ............ | H02M 3/155 |
| | | | | 323/313 |
| 2013/0049654 A1 | 2/2013 | Kure | | |

FOREIGN PATENT DOCUMENTS

| | | |
|---|---|---|
| JP | 4156258 B2 | 7/2008 |
| JP | 2009-54639 | 3/2009 |
| JP | 2009-159184 | 7/2009 |
| JP | 2009-159707 | 7/2009 |
| JP | 2010-200585 | 9/2010 |
| JP | 2011-82764 | 4/2011 |
| JP | 2013-118540 A | 6/2013 |

OTHER PUBLICATIONS

Office Action issued in corresponding Chinese Patent Application No. 2014104608266 mailed Aug. 3, 2016 (with English translation).

* cited by examiner

ELECTRIC POWER CONVERSION DEVICE

CROSS-REFERENCE TO RELATED APPLICATION

This application is based upon and claims the benefit of priority from Japanese Patent Applications No. 2013-195790, filed on Sep. 20, 2013 and No. 2014-162766, filed on Aug. 8, 2014; the entire contents of which are incorporated herein by reference.

FIELD

Embodiments described herein relate to an electric power conversion device.

BACKGROUND

In recent years, a demand for attaining a higher electric power density with an electric power conversion device (electric power density = the output electric power of the electric power convertor/the volume of the electric power convertor) is increasing. In order to achieve a higher electric power density, the volume of the electric power conversion device is required to be reduced.

The main portion of the volume of the electric power conversion device is passive components such as a cooling device, a capacitor, and an inductor, and in order to reduce the size of the cooling device, the loss of the electric power convertor needs to be reduced, and in order to reduce the size of a passive component, the switching frequency needs to be increased.

In general, the load of the electric power conversion device includes an inductance component. A basic equivalent circuit of a conventional electric power conversion device is shown in FIG. 1. A basic equivalent circuit of an electric power conversion device of FIG. 1 includes a power supply 1R, a parasitic inductance 2R, a diode 3R (free wheeling diode), a switching element 4R, a load 5R, and a gate circuit 6R.

When the switching element 4R turns on in the equivalent circuit of FIG. 1, an electric current flows through a circuit loop constituted by the power supply 1R, the parasitic inductance 2R, the load 5R, and the switching element 4R.

Subsequently, when the switching element 4R turns off, the electric current flows through the load 5R does not become zero in a very short time since the load 5R includes an inductance component. Therefore, an electric current flows through a circuit loop constituted by the load 5R and the diode 3R. Thereafter, when the switching element 4R turns on again, the circuit loop constituted by the power supply 1R, the parasitic inductance 2R, the load 5R, and the switching element 4R is formed, so that the electric current flowing through the diode 3R decreases, and the electric current flowing through the switching element 4R increases. The turn-on electric current waveform of the switching element 4R at this occasion is shown in FIG. 2.

As described above, when the switching element 4R turns on in the conventional electric power conversion device, a high frequency oscillation occurs in an electric current waveform, which becomes a noise source.

BRIEF DESCRIPTION OF THE DRAWINGS

FIG. 5 is an equivalent circuit diagram of an three-phase inverter according to a fourth embodiment, and is a figure for explaining a circuit operation when a low side switching element turns on; and FIG. 6 is an equivalent circuit diagram of a three-phase inverter according to the fourth embodiment, and is a figure for explaining a circuit operation when a high side switching element turns on.

DETAILED DESCRIPTION

Figure 1:
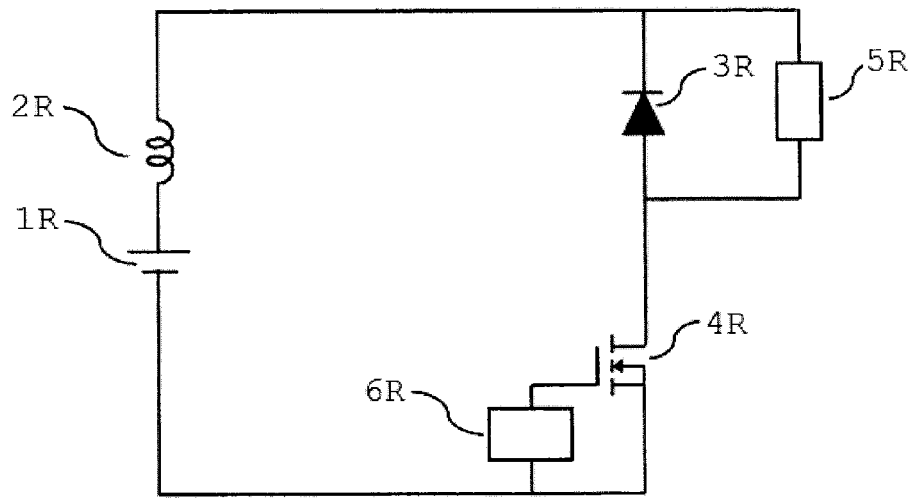
FIG. 1 is an equivalent circuit illustrating a conventional electric power conversion device.
Figure 2:
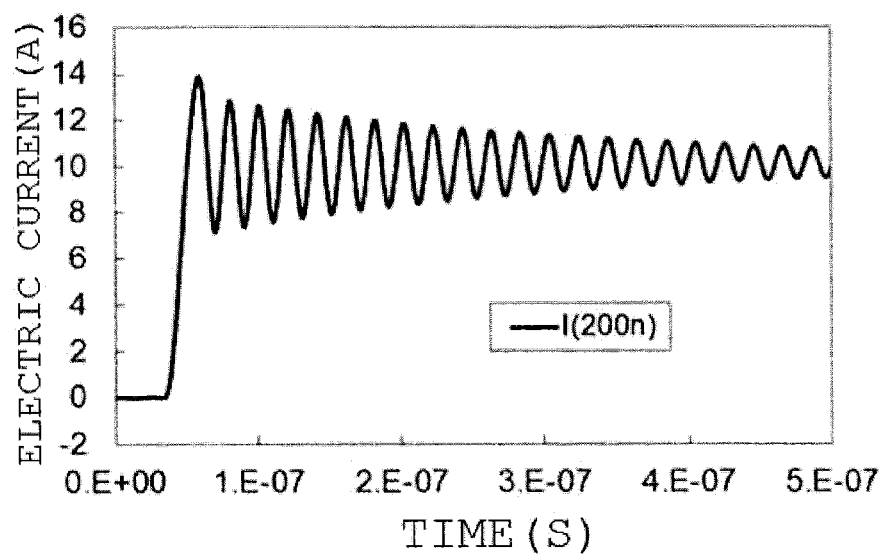
FIG. 2 is a graph illustrating a turn-on electric current waveform of a switching element in the conventional electric power conversion device, and indicates that a Schottky barrier diode is used, and the MOSFET turn-on electric current waveform is oscillating.

An electric power conversion device of an embodiment includes the electric power conversion device expressed as an equivalent circuit including, a power supply, a first parasitic inductance, a first diode; a second parasitic inductance connected to the first diode in series, a second diode connected to the first diode in parallel, a third parasitic inductance connected to the second diode in series, a switching element, a gate circuit, and a load. The equivalent circuit includes a first circuit loop and a second circuit loop. The first circuit loop includes the power supply, the first parasitic inductance, the first diode, the second parasitic inductance, the switching element, and the gate circuit. The second circuit loop includes the power supply, the first parasitic inductance, the second diode, the third parasitic inductance, the switching element, and the gate circuit. Where an LC resonance frequency based on the first parasitic inductance and the second parasitic inductance of the first circuit loop and a junction capacitance of the first diode is denoted as f1, and an LC resonance frequency based on the first parasitic inductance and the third parasitic inductance of the second circuit loop and a junction capacitance of the second diode is denoted as f2, the LC resonance frequency f1 and the LC resonance frequency f2 are different frequencies.

As described above, in the conventional electric power conversion device, when the switching element 4R turns off, the electric current waveform of the switching element 4R has a high frequency oscillation component overlaid thereon after attaining a load electric current.

This high frequency oscillation is generated in the circuit loop including the power supply 1R, the parasitic inductance 2R, the free wheeling diode 3R, and the switching element 4R, and is caused by an LC resonance of the parasitic inductance 2R and a junction capacitance (not shown) of the free wheeling diode 3R.

In general, the parasitic inductance (total parasitic inductance) of the circuit is in the order of several dozen nH to several hundred nH. The junction capacitance of the free wheeling diode is in the order of several hundred pF to several pF. The frequency of the high frequency oscillation (LC resonance frequency) is a high frequency in the order of several dozen MHz due to the parasitic inductance and the junction capacitance. There is a problem in that the high frequency in the order of several dozen MHz becomes a high frequency noise source.

When the switching speed of the switching element is reduced, the high frequency oscillation can be alleviated, but when the switching speed is reduced, there is a problem in that this increases the switching loss. More specifically, a trade-off exists between the suppression of the high frequency oscillation and the reduction of the loss.

The oscillation can be reduced by bringing the value of the parasitic inductance close to zero. However, when a switching element packaged in a TO-220 package and the like is used, there exists a parasitic inductance of about 10 nH unique to the package, and in principle, it is impossible to make the parasitic resistance be zero.

Therefore, the electric power conversion device according to the present embodiment is an electric power conversion device using a Schottky barrier diode made of a wide bandgap semiconductor for a free wheeling diode, wherein multiple circuit loops including Schottky barrier diodes are provided by making the Schottky barrier diodes into a parallel connection of two or more chips. In this case, the value of the parasitic inductance of each of the circuit loops is configured to be a different value and the value of the junction capacitance of each of the circuit loop is configured to be a different value, or a product of the value of the parasitic inductance and the value of the junction capacitance of each of the circuit loops is configured to be a different value, so that the LC resonance frequency based on the parasitic inductance and the junction capacitance of the Schottky barrier diode becomes a different value. Since the LC resonance frequencies of the circuit loops are of different values, the resonance frequencies of them both are laid on each other, so that a high frequency oscillation overlaid on a switching element can be suppressed. Since the high frequency oscillation is suppressed, the embodiment has an advantage in that the high frequency can be alleviated.

In this case, a wide bandgap semiconductor or a semiconductor using Si as a switching element that can reduce the loss is preferable. Examples of switching elements include wide gap semiconductors such as SiC, nitride semiconductor, or diamond. Examples of nitride semiconductors include GaN, AlGaN, InGaN, and AlInGaN. A Schottky barrier diode made of a wide bandgap semiconductor is expected to be used as a free wheeling diode. A Schottky barrier diode preferably use wide gap semiconductors such as SiC as recited above.

The Schottky barrier diode is a unipolar device in which the carrier for flowing electric current in the semiconductor is only the electrons, and therefore, the Schottky barrier diode attains a higher speed switching than a PiN diode which is a bipolar device in which carriers are electrons and holes. With the high speed switching, the switching loss can be reduced, and therefore, the efficiency of the electric power conversion device can be improved and the switching frequency can be increased. In the embodiment, wide gap semiconductors are preferably used as a switching element and a free wheeling diode. In the embodiment, the wide gap semiconductor is used, and for example, the switching is performed at a frequency equal to or more than 10 kHz and equal to be or less than 1000 kHz.

According to the above configuration, a high frequency oscillation can be attenuated in a short time without decreasing the switching speed of the switching element 4. More specifically, not only the high frequency oscillation can be suppressed, but also the loss can be reduced.

Hereinafter, the present embodiment will be explained further into details with reference to drawings.

[First Embodiment]

First, an electric power conversion device according to the first embodiment will be explained. The first embodiment relates to an electric power conversion device of which input voltage is a direct current and of which output voltage after the electric power conversion is a direct current.

Figure 3:
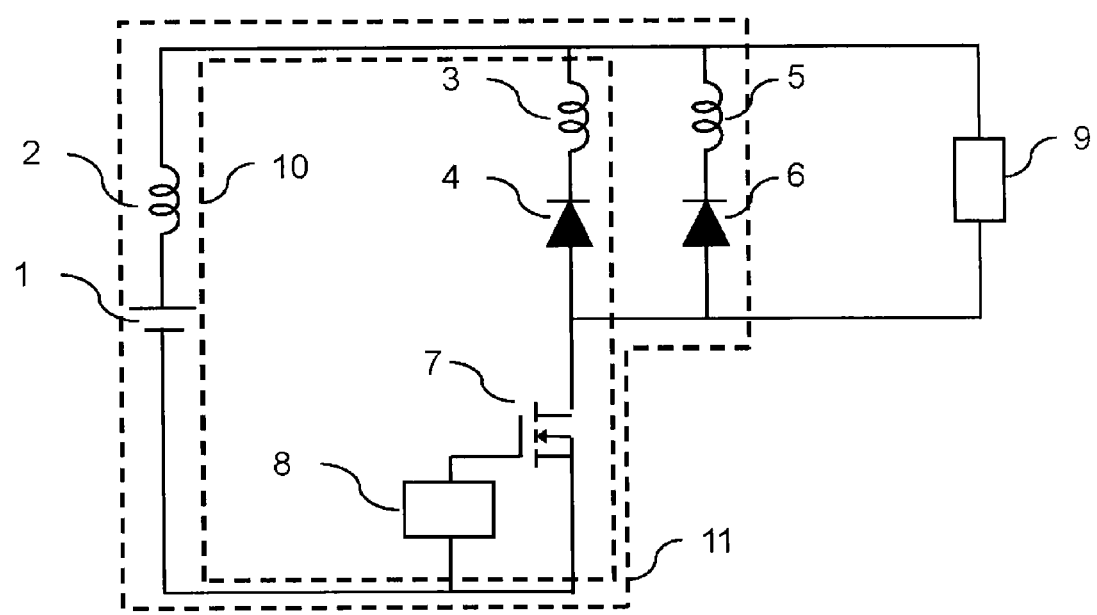
FIG. 3 is an equivalent circuit diagram illustrating an electric power conversion device according to a first embodiment.

FIG. 3 is an equivalent circuit of an electric power conversion device according to the present embodiment. The equivalent circuit of FIG. 3 includes an input power supply 1 (power supply), a first parasitic inductance 2, a first free wheeling diode 4 (diode), a second parasitic inductance 3 connected to the first free wheeling diode 4 in series, a second free wheeling diode 6, a third parasitic inductance 5 connected to the second free wheeling diode 6 (diode) in series, a switching element 7, a gate circuit 8, and a load 9. The first free wheeling diode 4 and the second free wheeling diode 6 are connected in parallel. The second parasitic inductance 3 and the third parasitic inductance 5 are connected in parallel. The gate electrode of the switching element 7 is connected to the gate circuit 8 connected with the power supply. The load 9 is connected in parallel with the free wheeling diodes.

The equivalent circuit of FIG. 3 has a first circuit loop 10 and a second circuit loop 11. In the equivalent circuit of FIG. 3, the first circuit loop 10 is constituted by the input power supply 1, the first parasitic inductance 2, the first free wheeling diode 4, the second parasitic inductance 3 connected to the first free wheeling diode 4 in series, and the switching element 7. In the equivalent circuit of FIG. 3, the second circuit loop 11 is constituted by the input power supply 1, the first parasitic inductance 2, the second free wheeling diode 6, the third parasitic inductance 5 connected to the second free wheeling diode 6 in series, and the switching element 7.

It should be noted that multiple free wheeling diodes may be constituted by multiple Schottky barrier diode chips in actual circuits, or multiple Schottky barrier diodes may be accommodated in a single package. Further, the switching element 7 may be made of a single element package such as MOSFET and IGBT in actual circuits, or an FET, an IGBT, and multiple Schottky barrier diodes may be accommodated in a single package. Such packaging enables reducing the size of the electric power conversion device.

In the circuit as shown in FIG. 3, the second parasitic inductance 3 connected to the first free wheeling diode 4 in series and the third parasitic inductance 5 connected to the second free wheeling diode 6 in series are configured to be of values different from each other. For example, the parasitic inductance is of a difference value according to the length of a wire in an actual circuit, a used semiconductor element, and the like. It should be noted that the first free wheeling diode 3 and the second free wheeling diode 5 have the same junction capacitance.

Therefore, the first LC resonance frequency f1 of the first circuit loop 10 and the second LC resonance frequency f2 of the second circuit loop 11 are of different values.

The high frequency oscillation overlaid on the electric current flowing through the switching element 7 is obtained by overlapping f1 and f2, and therefore, when f1 and f2 are selected so as to cancel the frequency component of each other, the high frequency oscillation overlaid on the electric current flowing through the switching element 7 can be reduced. Since the second parasitic inductance 3 and the third parasitic inductance 5 (the total parasitic inductance value of the first circuit loop 10 and the total parasitic inductance value of the second circuit loop 11) have different values, the first LC resonance frequency f1 and the second LC resonance frequency f2 are different. Since the first LC resonance frequency f1 and the second LC resonance frequency f2 have different values, the high frequency oscillation overlaid on the electric current flowing through the switching element 7 can be reduced in the electric power conversion device according to the embodiment.

The equivalent circuit of FIG. 3 is configured to have two circuit loops, but the number of circuit loops may be designed to e any number in accordance with the number of free wheeling diode connected in parallel. The high frequency oscillation can be more greatly reduced by increasing the number of circuit loops, but when the number of circuit loops increases, the footprint of the electric power conversion device increases, and therefore, a preferable number of circuit loops is set in accordance with the design condition.

A case where a third circuit loop, not shown, is included in the electric power conversion device (in the equivalent circuit) of the embodiment will be hereinafter explained. For example, a third free wheeling diode is connected to the first and second free wheeling diodes 4, 6 in parallel, and a fourth parasitic inductance is further provided to be connected to the third free wheeling diode in series. A third circuit loop is constituted by the input power supply 1, the first parasitic inductance 2, the third free wheeling diode (diode), the fourth parasitic inductance connected to the third free wheeling diode in series, and the switching element 7. When the LC resonance frequency of the third circuit loop is defined as f3, f3 is different from f1 and f2, and therefore, the high frequency oscillation flowing through the switching element 7 can be reduced. When the number of circuit loops is 4 or more, the fourth and subsequent loop circuits may be designed in the same manner as the second circuit loop 11 or the third circuit loop.

The equivalent circuit of FIG. 3 will be used as an example of explanation. When the LC resonance frequency f1 of the first circuit loop 10 is configured to be more than the LC resonance frequency f2 of the second circuit loop 11 by 2n times (n is an integer equal to or more than one), so that a time in point at which the amplitude of the resonance waveform of the first circuit loop 10 is the maximum matches a time in point at which the amplitude of the resonance waveform of the second circuit loop 11 becomes zero. As a result, it is preferable to increase the amplitude reduction effect of the waveform obtained by overlapping the resonance waveforms. When the number of circuit loops is three or more, it is preferable to set the LC resonance frequency in the same manner.

The equivalent circuit of FIG. 3 will be used as an example of explanation. In general, the direct current voltage of the input power supply 1 is set at a voltage half of the withstand voltage of the switching element 7.

In this case, when the induced electromotive force generated by each parasitic inductance in the first circuit loop 10 or the second circuit loop 11 (L×di/dt) becomes more than the direct current voltage of the power supply 1, the voltage applied to the switching element 7 becomes more than a withstand voltage, and the switching element 7 is destroyed. When the induced electromotive force generated by the parasitic inductance of any one of the first circuit loop 10 and the second circuit loop 11 is configured to be equal to or less than the direct current voltage of the power supply 1, a voltage equal to or more than the withstand voltage or more than the withstand voltage is prevented from being applied to the switching element 7, which is preferable. When the number of circuit loops is three or more, it is preferable to set the induced electromotive force and the withstand voltage of the switching element 7 in the same manner.

Subsequently, a circuit simulation was carried out for the circuit of FIG. 3, and the effect of the high frequency oscillation suppression according to the embodiment was verified. A circuit condition of simulation is shown in table 1.

TABLE 1

| | |
|---|---|
| Voltage of input power supply 1 | 300 V |
| Input voltage | Direct Current |
| Output voltage | 1 MHz |
| Switching frequency | 35 pF |
| Junction capacitance of diode | 30 nH |
| Inductance of first parasitic inductance 2 | 10 nH |
| Inductance of second parasitic inductance 3 | 40 nH |
| Inductance of third parasitic inductance 5 | 10 A |
| Electric current of load 9 | 1 MHz |

Figure 4:
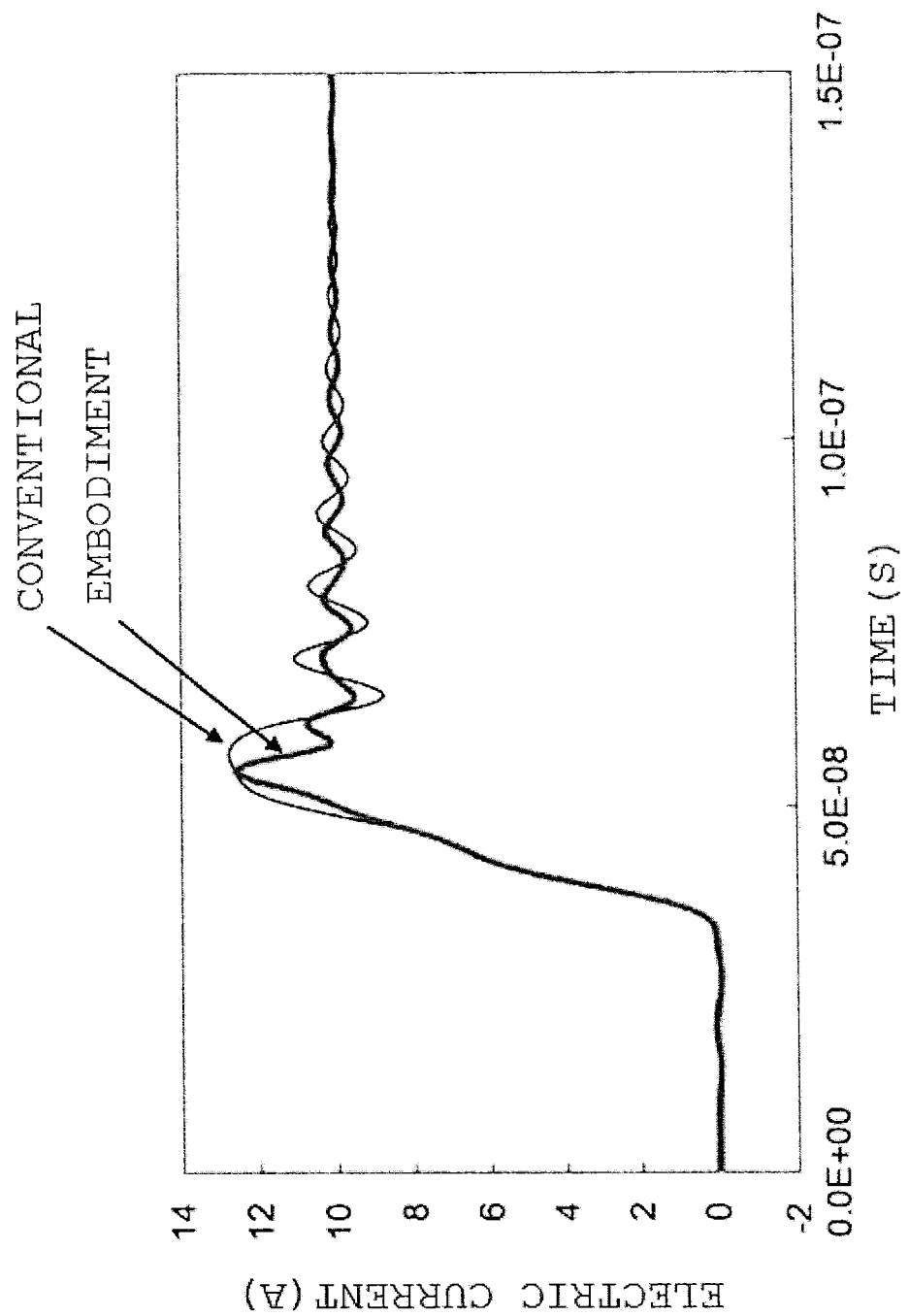
FIG. 4 is a graph illustrating a turn-on electric current waveform of a switching element in an electric power conversion device according to a first embodiment.

FIG. 4 is a graph illustrating a simulation result of electric current waveforms of switching elements in a case where the present embodiment is applied and in a case of a conventional method. This indicates that, when the method of the present embodiment is employed, the high frequency oscillation is attenuated in a shorter time. Therefore, the effectiveness of the present embodiment has been verified.

[Second Embodiment]

Subsequently, an electric power conversion device of the second embodiment will be explained.

The electric power conversion device according to the embodiment is an electric power conversion device using a Schottky barrier diode made of a wide bandgap semiconductor for a free wheeling diode, wherein multiple circuit loops including Schottky barrier diodes are provided by making the Schottky barrier diodes into a parallel connection of two or more chips. Further, the chip sizes of the Schottky barrier diodes of the circuit loops are configured to be different, so that the LC resonance frequency of each circuit loop based on the parasitic inductance and the junction capacitance of the Schottky barrier diode becomes a different value. Since the LC resonance frequencies of them both are laid on each other, the LC resonance is suppressed, and the high frequency oscillation can be reduced.

In the second embodiment, the chip sizes of the Schottky barrier diodes used as the free wheeling diodes are different, so that the junction capacitances of the diodes are changed, whereby the LC resonance frequency of each circuit loop is shifted.

[Third Embodiment]

Subsequently, an electric power conversion device according to the third embodiment will be explained.

The electric power conversion device of the embodiment is an electric power conversion device using a Schottky barrier diode made of a wide bandgap semiconductor for a free wheeling diode, wherein multiple circuit loops including Schottky barrier diodes are provided by making the Schottky barrier diodes into a parallel connection of two or more chips. In this case, the value of the parasitic inductance of each of the circuit loops is configured to be a different value and the chip size of the Schottky barrier diode is configured to be different, so that the LC resonance frequency of each circuit loop based on the parasitic inductance and the junction capacitance of the Schottky barrier diode becomes a different value. Since the LC resonance frequencies of them both are laid on each other, the LC resonance is suppressed, and the high frequency oscillation can be reduced.

In the third embodiment, the length of wire of each circuit loop is changed, so that the value of the parasitic inductance is a different value, and further, the chip size of the Schottky barrier diode used as the free wheeling diode is configured to be a different value, so that the junction capacitance of the diode is changed, whereby the LC resonance frequency of each circuit loop is shifted.

[Fourth Embodiment]

Figure 5:
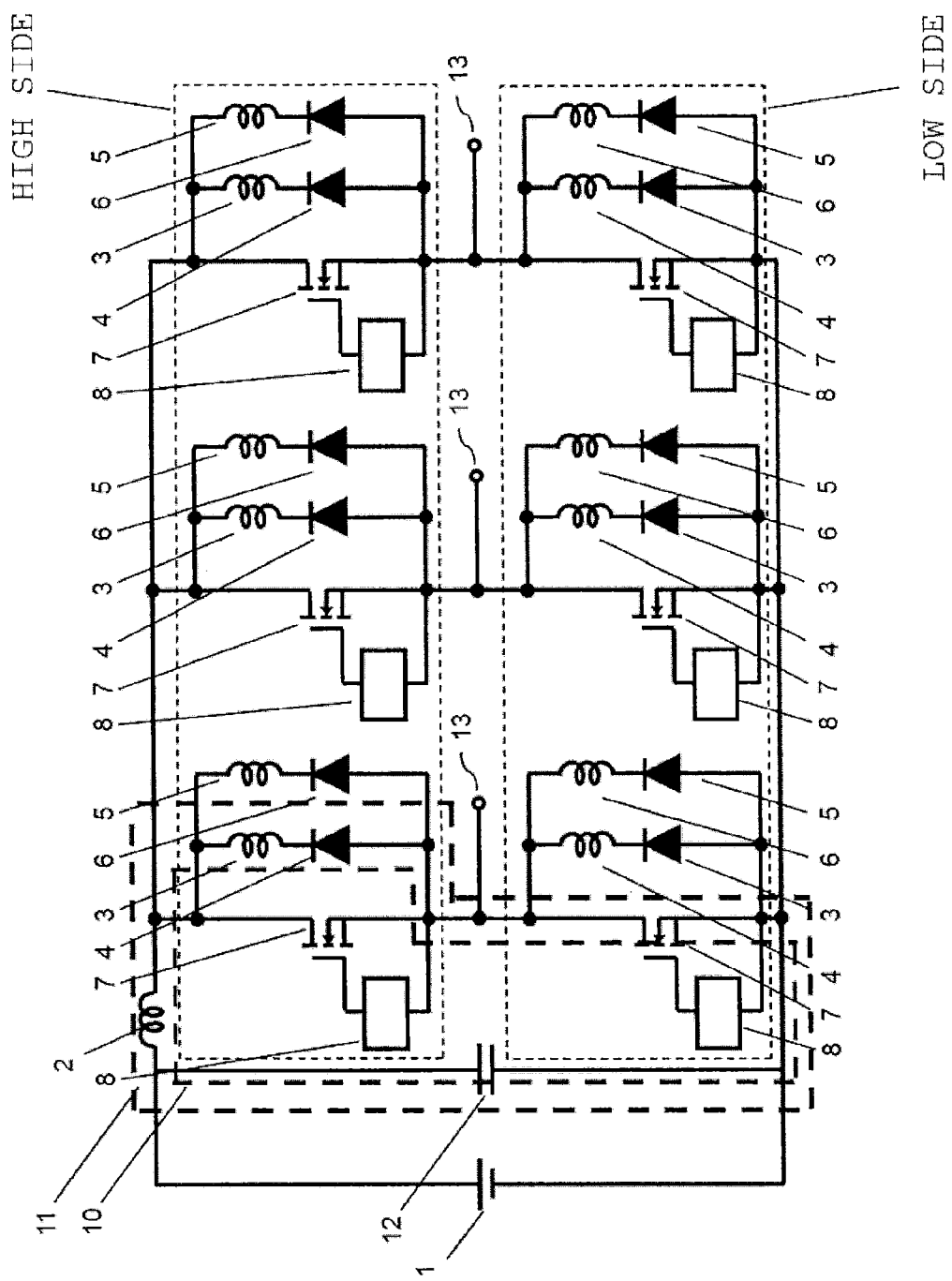

The fourth embodiment relates to an electric power conversion device of which input voltage is a direct current and of which output voltage is an alternating current, or an electric power conversion device of which input voltage is an alternating current and of which output voltage is a direct current. FIG. 5 is an equivalent circuit of a three-phase inverter according to the present embodiment. In the fourth embodiment, for example, an electric power conversion device will be explained with reference to an equivalent circuit of FIG. 5, of which input voltage is a direct current and of which output voltage is an alternating current. The electric power conversion device includes an input power supply 1, a capacitor 12, a first parasitic inductance 2, a first free wheeling diode 4, a second parasitic inductance 3 connected to the first free wheeling diode 4 in series, a second free wheeling diode 6, a third parasitic inductance 5 connected to the second free wheeling diode 6 in series, a switching element 7, a gate circuit 8, and an output terminal 13 of an inverter connected to the load.

In the circuit as shown in FIG. 5, the second parasitic inductance 3 connected to the first free wheeling diode 4 in series and the third parasitic inductance 5 connected to the second free wheeling diode 6 in series are configured to be different values.

In this case, circuit operation when the low side switching element 7 switches in the three-phase inverter as shown in FIG. 5 will be explained. When the low side switching element 7 turns on, the LC resonance frequency f1 of the first circuit loop 10 constituted by the capacitor 12, the first parasitic inductance 2, the high side first free wheeling diode 4, the second parasitic inductance 3 connected to the high side first free wheeling diode 4 in series, and the low side switching element 7 and the LC resonance frequency f2 of the second circuit loop 11 constituted by the capacitor 12, the high side second free wheeling diode 6, the third parasitic inductance 5 connected to the high side second free wheeling diode 6 in series, and the low side switching element 7 are different values.

The high frequency oscillation overlaid on the electric current flowing through the low side switching element 7 is obtained by overlapping f1 and f2, and therefore, when f1 and f2 are selected so as to cancel the frequency component of each other, the high frequency oscillation overlaid on the electric current flowing through the low side switching element 7 can be reduced.

Figure 6:
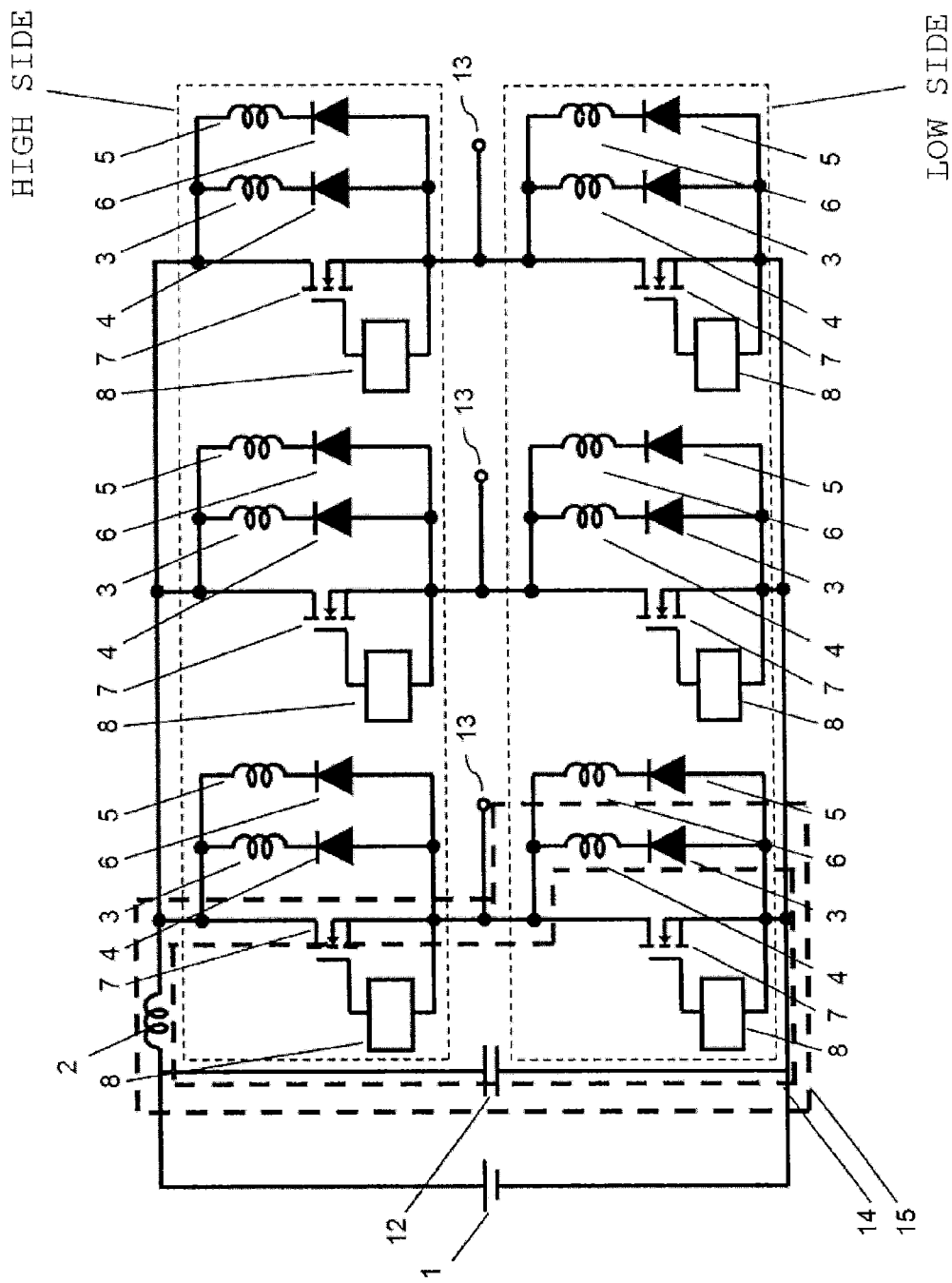

Subsequently, FIG. 6 shows a circuit operation when the high side switching element 7 switches. When the high side switching element 7 turns on, the LC resonance frequency f1 of the circuit loop 14 constituted by the capacitor 12, the low side first free wheeling diode 4, the second parasitic inductance 3 connected to the low side first free wheeling diode 4 in series, and the high side switching element 7 and the LC resonance frequency f2 of the second circuit loop 11 constituted by the capacitor 12, the first parasitic inductance 2, the low side second free wheeling diode 6, the third parasitic inductance 5 connected to the low side second free wheeling diode 6 in series, and the high side switching element 7 are different values.

The high frequency oscillation overlaid on the electric current flowing through the high side switching element 7 is obtained by overlapping f1 and f2, and therefore, when f1 and f2 are selected so as to cancel the frequency component of each other, the high frequency oscillation overlaid on the electric current flowing through the high side switching element 7 can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric power conversion device expressed as an equivalent circuit comprising: a power supply; a first parasitic inductance; a first diode; a second parasitic inductance connected to the first diode in series; a second diode connected to the first diode in parallel; a third parasitic inductance connected to the second diode in series; a switching element; a gate circuit; and a load, wherein the equivalent circuit includes a first circuit loop and a second circuit loop, the first circuit loop includes the power supply, the first parasitic inductance, the first diode, the second parasitic inductance, the switching element, and the gate circuit, the second circuit loop includes the power supply, the first parasitic inductance, the second diode, the third parasitic inductance, the switching element, and the gate circuit, where a first LC resonance frequency based on the first parasitic inductance and the second parasitic inductance of the first circuit loop and a junction capacitance of the first diode is denoted as f1 and a second LC resonance frequency based on the first parasitic inductance and the third parasitic inductance of the second circuit loop and a junction capacitance of the second diode is denoted as f2, the first LC resonance frequency f1 and the second LC resonance frequency f2 are different frequencies.

2. The device according to claim 1 further comprising a third diode connected to the first diode in parallel and a fourth parasitic inductance connected to the third diode in series in the equivalent circuit, wherein the equivalent circuit further includes a third circuit loop, the third circuit loop is constituted by the power supply, the first parasitic inductance, the third diode, the fourth parasitic inductance, the switching element, and the gate circuit, where a third LC resonance frequency based on the first parasitic inductance and the fourth parasitic inductance of the third circuit loop and a junction capacitance of the third diode is denoted as f3, the third LC resonance frequency f3 is a frequency different from the first LC resonance frequency f1 and the second LC resonance frequency f2.

3. The device according to claim 1, wherein the junction capacitance of the first diode and the junction capacitance of the second diode are different values, or the junction capacitance of the first diode, the junction capacitance of the second diode, and the junction capacitance of the third diode are all different values.

4. The device according to claim 1, wherein the second parasitic inductance and the third parasitic inductance are different values, or the second parasitic inductance, the third parasitic inductance, and the fourth parasitic inductance are all different values.

5. The device according to claim 1, wherein among the circuit loops, the LC resonance frequency of at least one circuit loop is 2n times (n is an integer equal to or more than one) higher than the LC resonance frequency of any one of the remaining circuit loops.

6. The device according to claim 1, wherein among the circuit loops, an induced voltage (L×di/dt) generated by the parasitic inductance of at least one circuit loop is equal to or less than an input direct current voltage of the electric power conversion device.

7. The device according to claim 1, wherein the diodes are such that a plurality of Schottky barrier diode chips is accommodated in a single package in an actual circuit.

8. The device according to claim 7, wherein the switching element is an MOSFET or an IGBT, and in an actual circuit, the MOSFET or the IGBT and the Schottky barrier diode chip are accommodated in a same package.

9. The device according to claim 7, wherein the Schottky barrier diode chip is made of SiC, a nitride semiconductor, or a diamond semiconductor.

10. The device according to claim 1, wherein an input voltage is a direct current, and an output voltage after the electric power conversion is a direct current.

11. The device according to claim 1, wherein an input voltage of the electric power convertor is an alternating current, and an output voltage after the electric power conversion is a direct current.

12. The device according to claim 1, wherein an input voltage of the electric power convertor is a direct current, and an output voltage after the electric power conversion is an alternating current.

13. The device according to claim 1, wherein a switching frequency of the switching element is equal to or more than 10 kHz and equal to or less than 1000 kHz.

* * * * *